US006525775B1

(12) United States Patent
Kahn et al.

(10) Patent No.: US 6,525,775 B1
(45) Date of Patent: Feb. 25, 2003

(54) METHOD FOR UPDATING SOFTWARE IN A DIGITAL TELEVISION RECEIVER USING RECORDED DATA

(75) Inventors: Michael Kahn, Westampton, NJ (US); David Goodwin, Yardley, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/169,645

(22) Filed: Oct. 9, 1998

(51) Int. Cl.[7] .......................... H04N 7/00; H04N 8/16; H04N 5/44; H04N 9/64
(52) U.S. Cl. ...................... 348/460; 348/461; 348/462; 348/476; 348/465; 348/553; 348/714; 725/132; 725/140; 725/152
(58) Field of Search ................................ 348/465, 553, 348/714, 718, 10, 712, 713, 460, 461, 476; 455/6.2, 6.3; 725/136, 144, 146–147, 151–152, 132, 140

(56) References Cited

U.S. PATENT DOCUMENTS

| | | | |
|---|---|---|---|
| 4,595,951 A | * 6/1986 | Filliman | 358/147 |
| 4,625,235 A | * 11/1986 | Watson | 348/476 |
| 4,638,359 A | * 1/1987 | Watson | 348/460 |
| 5,440,632 A | 8/1995 | Bacon et al. | 380/20 |
| 5,635,979 A | 6/1997 | Kostreski et al. | 348/13 |
| 5,666,293 A | 9/1997 | Metz et al. | 395/200.5 |
| 5,768,539 A | * 6/1998 | Metz et al. | 709/249 |
| 5,822,324 A | * 10/1998 | Kostresti et al. | 370/487 |
| 5,966,637 A | * 10/1999 | Kanungo et al. | 455/6.2 |
| 5,978,855 A | * 11/1999 | Metz et al. | 709/249 |
| 6,084,643 A | * 7/2000 | Kishtaka et al. | 348/725 |
| 6,101,368 A | * 8/2000 | Farnsworth | 455/3.2 |
| 6,137,539 A | * 10/2000 | Lownes et al. | 348/569 |
| 6,141,002 A | * 10/2000 | Kanungo et al. | 345/327 |
| 6,169,843 B1 | * 1/2001 | Lenihan et al. | 386/46 |

FOREIGN PATENT DOCUMENTS

WO    WO 98 23088    5/1998

* cited by examiner

*Primary Examiner*—John Miller
*Assistant Examiner*—Paulos Natnael
(74) *Attorney, Agent, or Firm*—RatnerPrestia

(57) ABSTRACT

A television receiver which is coupled to a digital VCR to receive an ATSC-encoded multi-program stream containing video, audio and data programs. The receiver recognizes one of the data programs as containing computer software for the digital television receiver, extracts the data program from the multi-program stream into a memory area which is separate from the memory areas used to decode the audio and video programs and then uses data in the extracted data program to update information which controls the operation of the television receiver. The television receiver includes a microprocessor which is coupled to a video processor via an IC bus. The video processor includes registers which are coupled to the IC bus. The microprocessor updates these values from the information in the extracted data program. The extracted data program may include a program image for the operational software for the microprocessor and may replace the operational software to update the operation of the television receiver. Alternatively, the extracted data program may include programming which applies to video and audio data that is recorded on the video tape and allows a user to interact with the presentation of the video and audio data.

9 Claims, 4 Drawing Sheets

METHOD FOR UPDATING SOFTWARE IN A DIGITAL TELEVISION RECEIVER USING RECORDED DATA

BACKGROUND OF THE INVENTION

The present invention relates generally to digital television receivers and in particular to a method for updating software in the digital television receiver using recorded data provided by a digital video cassette recorder (VCR), digital versatile disk (DVD) player, laptop computer or other source of stored video signal.

Computer software has been an essential component of television receivers for many years. It is used, for example, to implement digital tuning, respond to commands generated by remote control units, to decode and display closed caption information and to store and implement a user-preferred configuration of the television receiver.

The use of computer software in television receivers will only increase with the introduction of television receivers to receive terrestrially broadcast ATSC encoded digital television signals. Indeed, as these receivers are produced and used by the public, there may be additions to one or more of the ATSC standards to accommodate general viewer preferences. It would be advantageous if the digital television receivers that are in use when these changes are made could be reprogrammed to make use of the changes.

Typically, the computer software for digital television receivers is contained in read-only memories (ROMs). In order to reprogram the television receiver, the existing ROM must be replaced with a new ROM, containing the new programming. While the digital television receiver may be adapted so that the ROM can be replaced by the user, these adaptations add to the cost of the receiver and may introduce new opportunities for system failure caused, for example, by a ROM which is not seated properly in its socket.

Current analog television systems transmit one program per channel. Selection from among the channels being broadcast at any given time is made by adjusting the tuner to tune to the frequency of the desired channel.

Some digital television systems exist which transmit multiple programs via a satellite link. These systems include an electronic program guide which maps each program number into a particular transponder signal, a particular channel being transmitted by the transponder and a particular program in the channel. In these systems, the electronic program guide is required to tune to a program being carried by one of these digital satellite systems. Thus an electronic program guide must be generated at the head-end and decoded by the receiver in order to tune to a specific program.

The *Program and System Information Protocol for Terrestrial Broadcast and Cable* specification as described in publication DOC.A/56 published by Advanced Television Systems Committee, which is incorporated herein by reference for its teachings on digital the program and system information protocol (PSIP), describes a method by which television program information may be transmitted with a multiprogram data stream that conveys multiple programs in a single terrestrial broadcast channel or cable channel. Thus, each of several broadcasters who transmit signals in a given area may send a signal that contains a single high-definition program or multiple programs which may be either high-definition or standard definition programs. In addition, separate data programs, conveying information independent of the television programs may be transmitted in the multi-program data stream. These programs may include, for example, an EPG which covers all of the programs in the multi-program stream. When each broadcaster sends multiple programs over its channel, the standard describe a method by which these programs are identified.

The PSIP standard builds upon the ATSC Digital Television Standard DOC A/53 which, in turn, builds upon the MPEG-2 standard defined by the Moving Picture Experts Group (MPEG). The MPEG-2 standard is described in a publication entitled "Generic Coding of Moving Pictures and Associated Audio: Video, Recommendation H.626", ISO/IEC 13818-2, IS, 11/94 and the publication entitled "Generic Coding of Moving Pictures and Associated Audio: Systems, Recommendation H.222.0", ISO/IEC 13818-1, IS, 11/94 available from the International Standards Organization. All of these standards are hereby incorporated by reference for their teaching on digital video transmission and decoding.

SUMMARY OF THE INVENTION

The present invention is embodied in a television receiver which is coupled to a source of recorded video signal to receive an digital multi-program stream containing video, audio and data programs. The receiver recognizes one of the data programs as containing computer software for the digital television receiver, extracts the data program from the multi-program stream and uses the extracted data to update the programming of the digital television receiver.

According to one aspect of the invention, the extracted data program includes preference data for the television receiver and a microprocessor in the television receiver extracts the preference data from the data program.

According to another aspect of the invention, the extracted data program includes a program image for the operational software of the digital television receiver and the digital television receiver copies the extracted data program to a non-volatile memory area used for the operational software of the television receiver.

According to yet another aspect of the invention, the extracted data program includes computer software which may be executed by a microprocessor in the television receiver to effect a change in the programming of the digital television receiver.

According to yet another aspect of the invention, the extracted data program includes program selection information and programming to temporarily redefine commands received from a remote control unit to allow a viewer to interact with video and audio information in the multi-program stream.

According to yet another aspect of the invention, the multiprogram stream includes video and audio information which is decoded and presented while the data program is extracted, and the video and audio information describes the changes in programming made by the extracted data program.

DETAILED DESCRIPTION

Figure 1A:
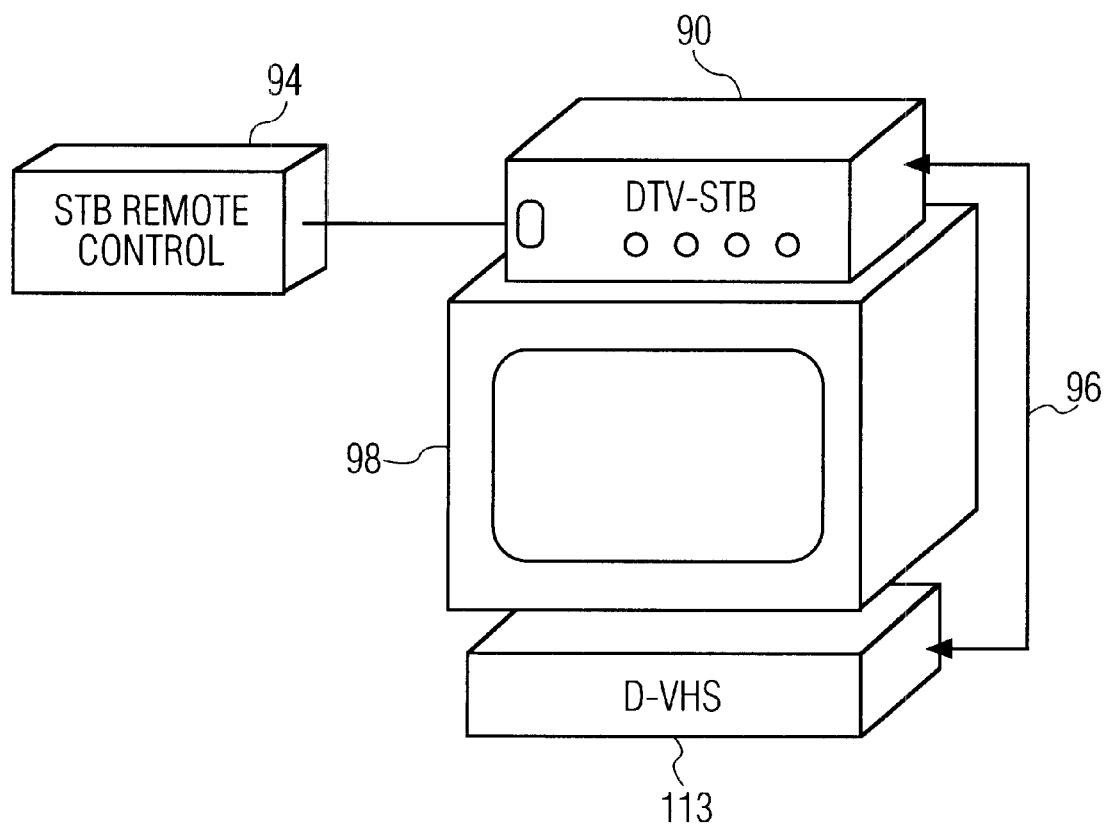
FIG. 1A is an isometric drawing, partly in block diagram form which illustrates a combination digital television set-top box, television display device and digital VCR.

FIG. 1A is a block diagram which illustrates an exemplary system configuration according to the present invention. In this system configuration, a digital television receiver 90, which, in the exemplary embodiment of the invention, is a set-top box (STB), is coupled to display video information on a video display device 98. The STB 90 is also coupled to provide digital video, audio and data signals to and receive digital video, audio and data signals from a digital VCR 113, which, in the exemplary embodiment of the invention, is a D-VHS device. The digital VCR 113 is coupled to the STB 90 via a digital communications channel 96. In the exemplary embodiment of the invention, the communications channel 96 is an IEEE 1394 bus. As described below, the digital VCR 113 receives and provides digital audio, video and data isosynchronously over the channel 96. Also shown in FIG. 1A is a remote control device 94 for the STB 90. The data program in the multi-program stream provided by the digital VCR 113 includes programming information which reconfigures the digital television receiver 90.

While the exemplary embodiment of the invention uses a digital VCR to provide the data program that reconfigures the digital television receiver 90, it is contemplated that other devices may be used, such as a digital versatile disk (DVD) player or laptop computer. Furthermore, it is contemplated that the digital data signal may be received in a broadcast signal or via a cable network. In this instance, a number of different data signals may be transmitted through the channel, each performing equivalent programming for a respectively different brand of digital television receiver. Alternatively, the data signal may correspond to a common programming convention that may be emulated by each of the different television receivers.

The exemplary embodiments of the invention decode conventional HDTV signals which have been encoded according to the MPEG-2 standard and in particular, the Main Profile High Level (MP@HL) and the Main Profile Main Level (MP@ML) MPEG-2 standards, and provides the decoded signals as video signals having a selected one of multiple formats.

Figure 1B:
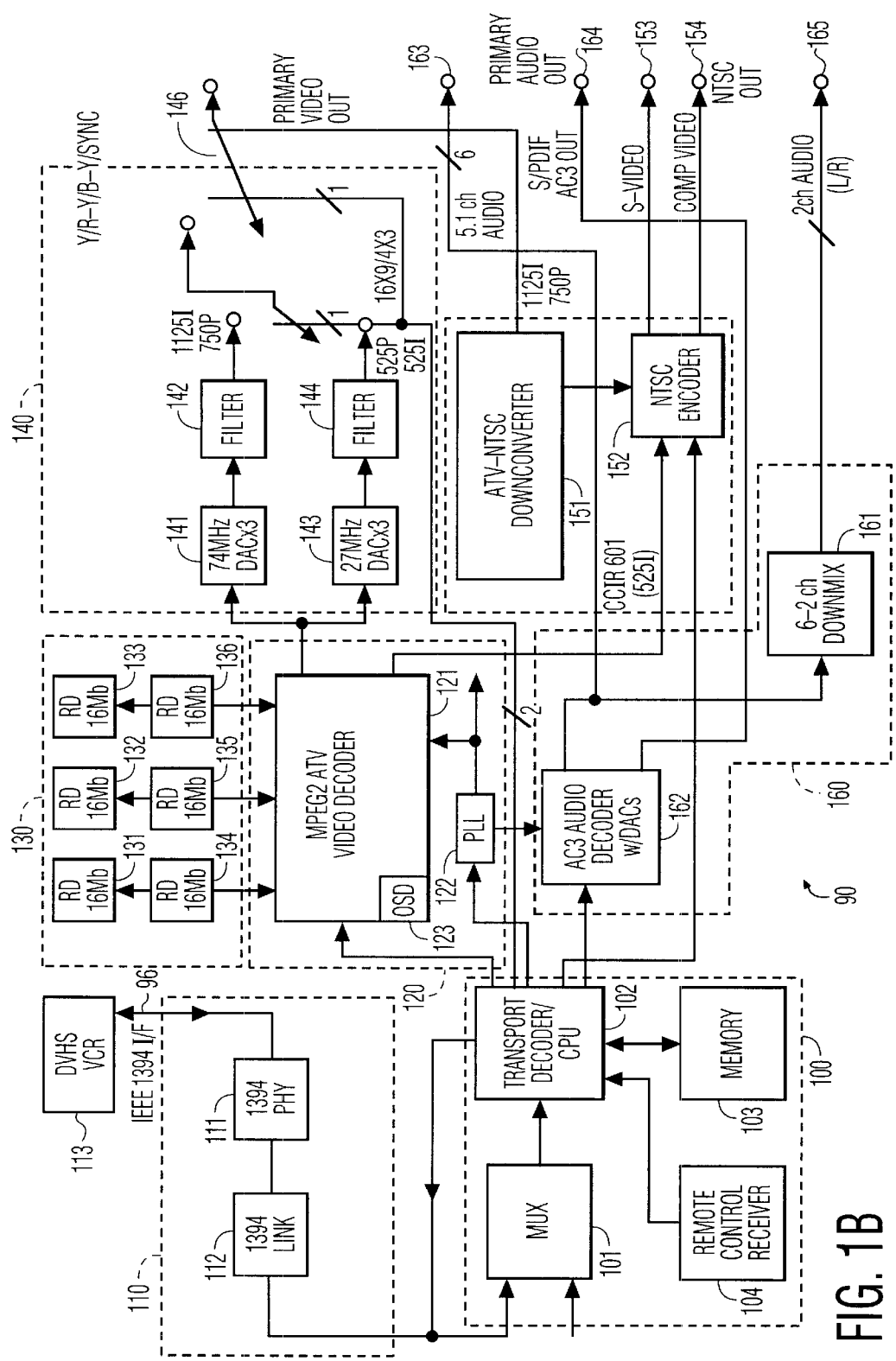
FIG. 1B is a block diagram of an exemplary digital television set-top box suitable for use in the combination shown in FIG. 1A.

FIG. 1B shows an exemplary embodiment of the STB 90, coupled to the digital VCR 113 via the bus 96. The exemplary STB 90 receives and decodes encoded video information at MP@HL or at MP@ML, formatting the decoded information to a user selected output video format (which includes both video picture and audio information), and interfaces for providing the formatted video output signals to display devices. The exemplary embodiments of the present invention are designed to support all ATSC video formats. For simplicity, the operation is divided into a Down Conversion (DC) mode which receives any MPEG Main Profile video bit-stream (constrained by FCC standards) and provides a 525P, 525I or NTSC format picture, and a Full Specification (FS) mode which provides a video display having a resolution of 1080I/1125I, 750P, 525I or 525P, depending on the format of the picture in the received MPEG Main Profile bit-stream.

The exemplary system of FIG. 1B includes a front end interface 100, a video decoder section 120 and associated Decoder Memory 130, a primary video output interface 140, an audio decoder section 160, a digital data interface 110, and an NTSC video processing section 150.

Referring to FIG. 1B, the front end interface 100 has a transport decoder and central processing unit (CPU) 102 with associated memory 103. Also included is a multiplexer 101 for selecting a multi-program or single program ATSC transport stream from a digital television tuner (not shown) or, for example, a digital VHS video cassette recorder (DVHS VCR) 113 via the digital interface 110. In the exemplary embodiment of the invention, the interface 110 operates according to the IEEE 1394 link layer protocol. The IEEE 1394 bus is described in a technical standard *IEEE 1394 Standard for a High Performance Serial Bus IEEE STD* 1394-1995, Aug. 30, 1996. This bus includes an isosynchronous data transfer mode and an asynchronous data transfer mode. In the exemplary embodiment of the invention, bit-stream data is conveyed between the digital VCR 113 and the multiplexer 101 in the isosynchronous mode using a direct memory access (DMA) data transfer technique.

As set forth above, the other input port of the multiplexer 101 is coupled to receive an encoded transport stream from a digital television tuner (not shown). The transport decoder 102 processes the received transport packets to produce compressed audio, video and data information, which may be, for example, packetized elementary stream (PES) packets according to MPEG-2 standard. The transport decoder may provide either the PES packets of video and audio information directly to the respective video decoder section 120 and audio decoder section 160, or may further convert the PES packets into one or more elementary streams and provide these elementary streams to the video and audio decoders. Finally, the front-end interface 100 includes a remote control receiver 104 which, for example, may receive infra-red (IR) commands from the remote control unit 94 (shown in FIG. 1A) and provide these commands to the CPU of the transport decoder/CPU 102.

The video decoder section 120 includes an ATV Video Decoder 121 and digital phase locked loop (DPLL) 122. If the ATV video Decoder 121 receives PES packets from the front end interface 100, it converts the packets into an elementary video bit-stream. A front end picture processor of the ATV Video Decoder 121 then decodes the elementary stream according to the encoding method used, to provide luminance and chrominance pixel information for each image picture.

The ATV Video Decoder 121 further includes a memory subsystem (not separately shown) to control decoding operations using an external memory 130. The memory subsystem also provides image picture information to a display section of the ATV video decoder 121 which processes decoded picture information into a desired picture format. The DPLL 122 is used to generate timing signals to synchronize processing operations between the video Decoder section 120, Decoder Memory 130 and audio decoder section 160. The Decoder Memory 130 includes a first group of memory units 131, 132 and 133 which may each be a 16 Mb RDRAM memory, and a second group of memory units 134, 135 and 136, which may also each be a 16 Mb RDRAM memory.

The video decoder 120 decodes a video bit-stream which corresponds to the ATSC Digital Television Standard, DOC A/53. The video portion of this standard is a subset of the above-referenced MPEG-2 video standard. These signals are encoded in five hierarchical layers, the Sequence layer, the Group of Pictures layer, the Picture layer, the Slice layer and the Macroblock layer. The actual image data is in the Macroblock layer, the higher layers contain header information which is used in the decoding process. In the exemplary embodiment of the invention, the header information in the Sequence, Group of Picture and Picture layers is decoded by the microprocessor in the transport decoder 102 while the Slice and Macroblock layers are decoded by the video decoder 120. The exemplary video decoder 120 is an application specific integrated circuit (ASIC) which is connected to the microprocessor of the transport decoder 102 via a dedicated parallel bus. The parallel bus is used to provide operational constants to the ASIC. The ASIC may only be programmed to the extent that these constants may be changed. As set forth below, however, the microprocessor in the transport decoder 102 can be more generally reprogrammed. Accordingly, the decoding operations performed on the Sequence, Group of Pictures and Picture layers may be changed using a programming operation according to the present invention, and the processing of the Slice and Macroblock layers may be changed to a lesser extent.

The primary video output interface 140 includes a first Digital to Analog converter (DAC) 141. The DAC 141 may include, for example, three DACs which process, respectively, the luminance signal Y and the $C_R$ and $C_B$ chrominance signals. These DACs operate at 74 MHz, to produce an analog output signal for a filter 142. The filter operates to remove sampling artifacts from the analog signal provided by the DAC 141. This interface produces video signals having 1125I, 1080I, 750P, 525P or 525I formats, depending on the format of the received encoded signal. The interface 140 also includes a second DAC 143. The DAC 143 also includes three DACs which convert, respectively the luminance signal, Y, and the $C_R$ and $C_B$ chrominance signals. These DACs, however, operate at 27 MHz to provide analog output signals for a filter 144. The output signal of the filter 144 is a video signal having a 525I or 525P format. The primary video output interface 140 converts the digitally encoded video signals having a desired format into analog video signals having chrominance and luminance components which correspond to the desired format.

The audio decoder section 160 includes an AC3 Audio decoder 162 which provides audio signals at output ports 163 and 164, and optional 6-2 channel down mixing processor 161 to provide 2 channel audio signals at output port 165. The audio processing of MP@HL according to the MPEG-2 standard generates audio signal components from encoded digital information and provides the audio signal components via analog output at output ports 163, 164 and 165. Decoders of this type are well known in the art. An audio decoder suitable for use as the decoder 160 is a ZR38500 Six Channel Dolby Digital Surround Processor, available from the Zoran Corporation of Santa Clara, Calif.

In the exemplary embodiment of the invention, the digital data interface 110 is coupled to the DVHS VCR 113 to transmit and receive a transport stream using, for example, the IEEE 1394 data communications protocol. The interface 110 includes a physical layer processor 111, which may be, for example, a PDI1394P11 integrated circuit (IC), and link layer processor 112, which may be, for example, a PDI1394L11 IC. The physical layer processor 111 and link layer processor 112 pass the transport packets containing the bit-stream between the DVHS VCR 113 and multiplexer 101.

The ATV video decoder 121 includes an on-screen display (OSD) processor 123 which may be used to generate control menus, to provide information on the status of the set-top box, or to provide closed caption information. The OSD processor 123 may include a character generator and a graphics generator. It may access a dedicated OSD area in the memory 130 to produce a bit-mapped display which overlays the video image produced at the primary video output port 146 and at the secondary video output ports 153 and 154.

The NTSC video processing section 150 includes an ATV-NTSC down conversion processor 151 which converts the analog HDTV signal provided by the filter 142 into a 525I signal. The NTSC encoder 152 receives a 525I analog signal and converts the signal to the NTSC formatted video signal at secondary video output ports 153 (S-video) and 154 (composite video).

Figure 2:
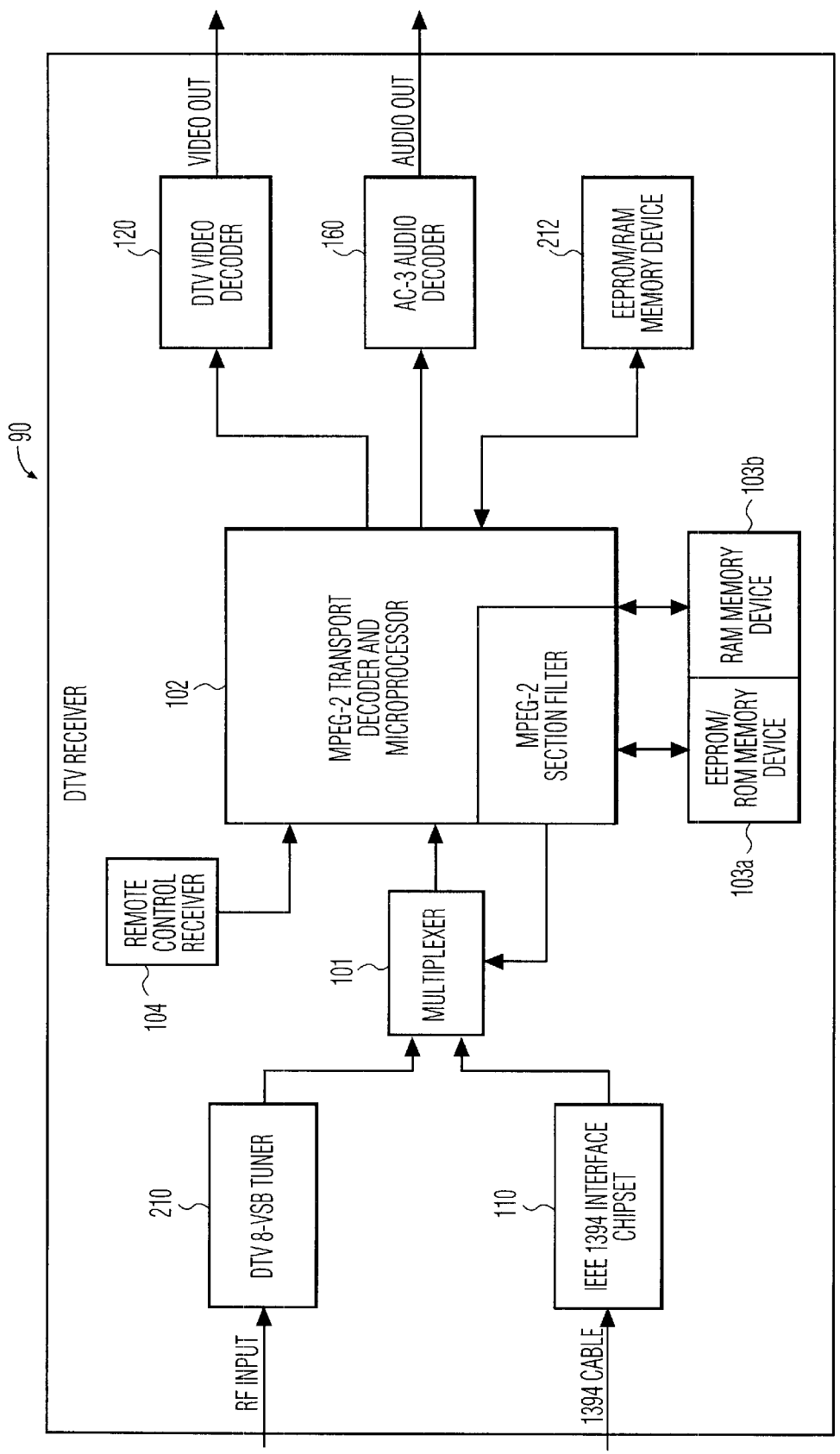
FIG. 2 is a simplified drawing of the digital television set-top box which is useful for describing the operation of the invention.

FIG. 2 is a block diagram of the television receiver 90 which shows additional details of the transport decoder 102. In FIG. 2, the MPEG-2 transport decoder 102 receives an MPEG-2 transport stream from either the DTV 8-VSB tuner 210 or from the IEEE 1394 interface 110 via the multiplexer 101. The multiplexer 101 is controlled by a signal provided by the microprocessor of the transport decoder 102. The microprocessor, in turn, determines which input path to select from control signals received via the remote control receiver 104.

The transport decoder 102 processes the bit-stream to extract PES packets of selected programs in the multi-program transport stream. As set forth above, the video PES packets are provided to the DTV video decoder 120 and the audio PES packets are provided to the AC-3 audio decoder 160. In addition, decoded data transport packets for a selected data program are decoded and provided to a memory device 212. As described below, the memory device 212 may be a volatile or nonvolatile random access memory (RAM).

In decoding the transport stream, the transport decoder 102 utilizes two memories a read only memory (ROM) or electrically erasable programmable read only memory (EEPROM) 103a and a RAM 103b. The memory 103a holds the program code which controls the operation of the microprocessor and, thus, the transport decoder 102 and the video decoder 121. The memory 103b is used to temporarily hold values that are used in decoding the transport stream and in decoding the Sequence, Group of Pictures and Picture layers of the ATSC video syntax. These values include the PES packets for the video and audio programs, as they are being assembled, and the data stream for the selected data program.

According to the present invention, the IEEE 1394 channel provides an ATSC transport stream which includes at least a data program but may also include one or more video and audio programs. The transport decoder 102 extracts the data program from the transport stream and stores it into the memory 212. From the memory 212, the data may then be sent to the video decoder 120 and/or audio decoder 160 via the parallel bus that serves as the interface between the microprocessor in the transport decoder 102 and the video decoder 120 and audio decoder 160. The decoded data program may also be stored into the EEPROM memory device 103a to augment or replace the computer software which controls the microprocessor of the transport decoder 102. If the program code in the memory 103a is to be replaced, it may be desirable to implement the transfer from the memory 212 to the memory 103a during system initialization, reserving a small area of the memory 103a to hold a bootstrap loader which is not overwritten by the program transferred from the memory 212. As another alternative, the memory 212 may be mapped as an extension to the address space of the memory 103a and any program code and associated data which is decoded from the data program in the transport stream may be used directly from the memory 212.

Figure 3:
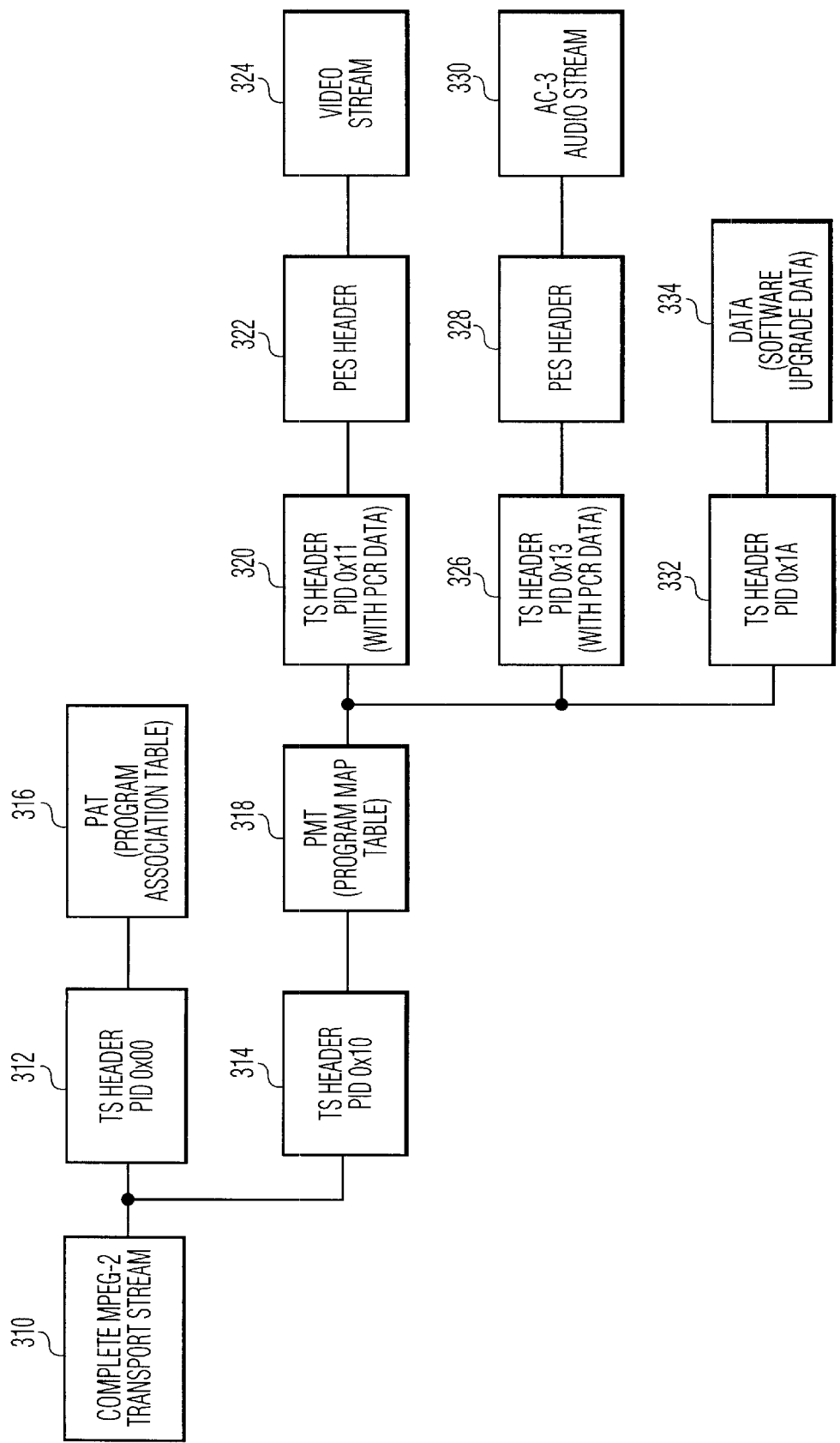
FIG. 3 is a data structure diagram of the transport stream which is useful for describing the extraction of the data program from the multi-program bit-stream.

FIG. 3 is a data structure diagram which is useful for describing the relationship among data structures in the transport stream and how these data structures may be used to parse the transport stream into separate audio, video and data programs. The complete MPEG-2 transport stream is shown as block 310. This block includes transport packets 312 which have a packet identifier (PID) of 0x00. Under the MPEG-2 System standard, these packets contain the program association table (PAT). The PAT includes a mapping of the PIDs for all of the programs in the multi-program transport stream including pointers to program map tables (PMTs) for each combination of programs (i.e. video, audio and data) which together form a single presentation.

Blocks 314 and 318 illustrates the (PMT) which has a PID of 0x10. As shown, the PMT 318 contains the PIDs 0x11 for the video program 320, 0x13 for the audio program 326 and 0x1A for the data program 332. The video transport packet data represented by the block 320 is further transformed into video PES packets 322 by removing the header bytes from the transport packets having 0x11 as a PID and concatenating the transport packet payloads. Similarly, the PES packets are converted into a video bit-stream 324 by removing the PES headers and concatenating the PES packet payloads.

The audio transport packet data represented by the block 326 is similarly transformed into audio PES packets 328 by removing the header bytes from the transport packets which have 0x13 as a PID and concatenating the transport packet payloads. These PES packets are then converted into an audio bit-stream 330 by removing the PES headers and concatenating the PES packet payloads. Both the PES packets and the elementary audio and video bit-streams include program clock reference (PCR) values which specify when the decoded data should be provided to a user. These values synchronize the presentation of the audio and video information.

The final data structures in FIG. 3 are the data program transport packets having, in this example, a PID of 0x1A. In the exemplary embodiment of the invention, these packets are processed by removing the transport headers and concatenating the transport payloads to form the software upgrade data 334. Although not shown, it is contemplated that the decoded data 334 may also include verification features such as CRC codes or digital certificates which may be processed by other processes in the microprocessor to verify that the program code is correct and complete before it is used.

The programming method and apparatus described above may be used for many purposes. For example, it may be used to upgrade an existing digital television receiver to provide additional features or to fix errors in the existing program code. This may be done, for example, by recording the new program onto a digital video tape as a data program along with a video arid audio program which describes and teaches the new features. While the viewer is watching the video program, the digital television receiver is decoding the new program and storing it into the memory 212 (shown in FIG. 2). After viewing the video tape, the viewer is instructed to turn the digital television receiver 90 off and on to load the new program.

Another use for the programming method and apparatus is to allow a viewer to interact with a presentation. A presentation may be designed, for example, with several parallel video programs and audio programs, each representing an alternative to at least one part of the presentation. For example, a story may have a happy ending or a tragic ending. The presentation, including all of the alternative video and audio programs may be recorded on a single video tape with a data program that changes the operation of the digital television receiver to display choices to the viewer, for example, via the on-screen display feature 123 (shown in FIG. 1B), before a switch in the programming needs to be made, and reprograms the response to certain keys on the remote control device 94 (shown in FIG. 1A) to allow a user to switch between the alternative audio and video programs at defined instants.

While the invention has been described in terms of an exemplary embodiment, it is contemplated that it may be practiced as described above within the scope of the appended claims.

What is claimed:

1. A method, for reprogramming a digital television receiver including a microprocessor and a separately programmable video decoder for decoding compressed digital television signals coupled to the microprocessor via a control bus, the method comprising the steps of:

receiving a multi-program transport stream containing a video program, an audio program and a data program;

extracting the data program from the multi-program transport stream into a data memory area;

transferring the extracted data program to a program memory area which holds programming information for the digital television receiver; and transferring data from the data memory area to change programmable operational constants in the video decoder to reprogram the video decoder.

2. A method according to claim 1, wherein the step of transferring the extracted data program to the memory area which holds programming information for the digital television receiver includes the step of transferring the extracted data program to a non-volatile memory device.

3. A method according to claim 1, wherein the data program includes instructions which may be executed by the microprocessor and the step of transferring the extracted data program to the memory area which holds programming information for the digital television receiver includes the step of executing the instructions in the extracted data program.

4. A method according to claim 1, wherein the multi-program transport stream includes multiple video and audio programs, the television receiver includes a remote control device and the extracted data program includes program selection information and programming to temporarily redefine commands received from the remote control unit to allow a viewer to interactively select video and audio information from the multi-program transport stream.

5. A method for reprogramming a digital television receiver including a microprocessor and a separately programmable video decoder for decoding compressed digital television signals coupled to the microprocessor via a control bus, the method comprising the steps of:

receiving a multi-program transport stream containing a video program, an audio program and a data program;

extracting the data program from the multi-program transport stream into a data memory area; and transferring the extracted data program to a program memory area which holds programming information for the digital television receiver;

wherein the video program and the audio program include information for a user concerning changes in the operation of the television receiver which result from transferring the extracted data program to the program memory area.

6. Apparatus, for reprogramming a digital television receiver comprising:

a memory including a data memory area and a program memory area which holds programming information for the digital television receiver;

a microprocessor coupled to the memory;

a video decoder, separate from the microprocessor, for decoding compressed digital television signals, the video decoder including a plurality of programmable operational constants;

a control bus connecting the microprocessor to the video decoder;

means for receiving a multi-program transport stream containing a video program, an audio program and a data program;

a transport decoder which extracts the data program from the multi-program transport stream into the data memory area;

means for transferring the extracted data program from the data area to the program memory area; and means for transferring data from the data memory area to programmable operational constants in the video decoder under control of the microprocessor to reprogram the video decoder.

7. Apparatus according to claim 6, wherein the program memory is a non-volatile memory device.

8. Apparatus according to claim 6, wherein the data program includes instructions which may be executed by the microprocessor and the means for transferring the extracted data program to the memory area which holds programming information for the digital television receiver includes means for executing the instructions in the extracted data program.

9. Apparatus according to claim 6, wherein the multi-program transport stream includes multiple video and audio programs, the television receiver includes a remote control device and the extracted data program includes program selection information and programming to temporarily redefine commands received from the remote control unit to allow a viewer to interactively select video and audio information from the multi-program transport stream.

* * * * *